United States Patent
Schwarze

(10) Patent No.: US 7,475,123 B2
(45) Date of Patent: Jan. 6, 2009

(54) WEB SERVICE INTEGRATION

(75) Inventor: Peter Schwarze, St. Leon-ROT (DE)

(73) Assignee: SAP AG, Walldorf (DE)

( * ) Notice: Subject to any disclaimer, the term of this patent is extended or adjusted under 35 U.S.C. 154(b) by 913 days.

(21) Appl. No.: 10/712,759

(22) Filed: Nov. 12, 2003

(65) Prior Publication Data

US 2004/0139154 A1 Jul. 15, 2004

Related U.S. Application Data

(60) Provisional application No. 60/427,509, filed on Nov. 18, 2002.

(51) Int. Cl.
*G06F 15/16* (2006.01)
*G06F 15/173* (2006.01)

(52) U.S. Cl. .................... 709/217; 709/203; 709/238

(58) Field of Classification Search ........ 709/201–203, 709/217–219, 227–232, 238, 245; 705/26–29
See application file for complete search history.

(56) References Cited

U.S. PATENT DOCUMENTS

| | | | |
|---|---|---|---|
| 6,324,534 B1 | 11/2001 | Neal et al. | |
| 6,766,454 B1* | 7/2004 | Riggins | 713/185 |
| 7,047,211 B1 | 5/2006 | Van Etten et al. | |
| 2002/0133392 A1* | 9/2002 | Angel et al. | 705/10 |
| 2002/0138370 A1* | 9/2002 | Dan et al. | 705/27 |
| 2003/0002526 A1* | 1/2003 | Dias et al. | 370/466 |
| 2003/0105884 A1* | 6/2003 | Upton | 709/318 |
| 2003/0177070 A1 | 9/2003 | Viswanath et al. | |
| 2003/0182392 A1* | 9/2003 | Kramer | 709/217 |
| 2003/0191677 A1* | 10/2003 | Akkiraju et al. | 705/8 |
| 2003/0212587 A1* | 11/2003 | Jamison | 705/8 |
| 2004/0148232 A1 | 7/2004 | Fushimi et al. | |
| 2004/0199636 A1* | 10/2004 | Brown et al. | 709/227 |
| 2005/0234888 A1 | 10/2005 | Bailey et al. | |

FOREIGN PATENT DOCUMENTS

EP  0697669 A2  2/1996

(Continued)

OTHER PUBLICATIONS

Etzioni, O., "The World Wide Web: Quagmire or Gold Mine?" Communications of the ACM, vol. 39, No. 11, pp. 65-68, Nov. 1996.

(Continued)

*Primary Examiner*—Yasin M Barqadle
(74) *Attorney, Agent, or Firm*—Mintz, Levin, Cohn, Ferris, Glovsky and Popeo P.C.

(57) ABSTRACT

An enterprise system may include a server including an integration module that enables applications at the server to integrate web services, e.g., by providing links to the external web service. Each application is associated with one or more business types in a table at the server. The integration module, which may be an API, sends a list of external web services of a type (or types) associated with an application when a user at a client computer in the enterprise system opens that application. The integration module may also generate a URL call and redirect the user's browser to an external web service when the user selects that external web service.

16 Claims, 6 Drawing Sheets

FOREIGN PATENT DOCUMENTS

KR        20020066719 A     8/2002

OTHER PUBLICATIONS

Mendelson, E., "Innovative Software GMBh: Java Booster," PC Magazine, vol. 17, No. 6, p. 199, Mar. 24, 1998.

Anon., "Lexmark Joins E-Commerce Pilot to Give Customers Easier and Better Way to Compare Products on the Web," Business Wire, Jul. 27, 1998.

Dorobek, C., "Group Demos Way to Shop Multiple E-Catalogs," Government Computer News, vol. 17, No. 40, p. 8, Dec. 14, 1998.

Anon., "Intelisys Partners with Mercado Software to Offer Intuitive Search Across Multi-Supplier Catalogs without the Need for Normalization," Business Wire, p. 0143, May 15, 2000.

Anon., "EasyAsk Breaks the Search Barrier; Early Adopter is Building a Distributed E-Commerce Supplier Network," Business Wire Jul. 31, 2000.

Anon., "Easy Spirit Adopts e7th's Secure Online Wholesale Transaction Technology; Nine West's Largest Brand Becomes 34th Retailer in e7th's Multi-vendor Catalog," Business Wire, Sep. 26, 2000.

Anon., "SPS Commerce Launches B-to-B Catalog Synchronization Capabilities to Increase Supply Chain Efficiencies," PR Newswire, Apr. 30, 2001.

Anon, "Convera and PartNET Selected by Department of Defense EMALL; Improved Site Eases Use by Providing Seven Advanced Search Options," Business Wire, Jun. 25, 2002.

* cited by examiner

Sample OCI Outbound Interface Fields

| Description | Mandatory | Catalog-Specific | Field Name | Field Name Variable/Fixed |
|---|---|---|---|---|
| Catalog URL | Yes | Yes | <Blank> | Fixed |
| All Catalog Specific Fields | As Relevant | Yes | | Variable |
| Return URL | Yes | No | IIOOK URL | Variable |
| OK Code | Yes | No | ~OKCODE | Fixed |
| Target | Yes | No | ~TARGET | Fixed |
| Caller | Yes | No | ~CALLER | Fixed |

FIG. 5A

Sample OCI Inbound Interface Fields

| Item | Name | Required/Optional | Type Length |
|---|---|---|---|
| Description | NEW_ITEM-DESCRIPTION[n] | Required if Product Master is not Specified | CHAR-40 |
| Product Master | NEW_ITEM-MATNR[n] | Required if the Description Field is not Specified | CHAR-18 |
| Product Group | NEW_ITEM-MATGROUP[n] | Optional | CHAR-10 |
| Quantity | NEW_ITEM-QUANTITY[n] | Required | CHAR-15 |
| Unit of Measure | NEW_ITEM-UNIT[n] | Required if Product Master Field is not Filled | CHAR-3 |
| Price | NEW_ITEM-PRICE[n] | Optional | CHAR-15 |
| Price Unit | NEW_ITEM-PRICEUNIT[n] | Optional | CHAR-9 |
| Currency | NEW_ITEM-CURRENCY[n] | Required if Price is Returned, Otherwise Optional | CHAR-5 |
| Lead Time | NEW_ITEM-LEADTIME[n] | Optional | CHAR-5 |
| Vendor | NEW_ITEM-VENDOR | Optional | CHAR-10 |
| Product ID | NEW_ITEM-EXT_PRODUCT_ID[n] | Optional | CHAR-40 |
| Catalog ID | NEW_ITEM-EXT_CATEGORY | Optional | CHAR-40 |

FIG. 5B

WEB SERVICE INTEGRATION

CROSS REFERENCE TO RELATED APPLICATIONS

This application claims the benefit of priority from U.S. Provisional Application entitled "Web Service Integration", filed Nov. 18, 2002, application Ser. No. 60/427,509, which is incorporated herein by reference.

BACKGROUND

Computers may use browsers to interface with the World Wide Web and other Internet-based networks, such as enterprise portals. Many browsers allow users to add links to their favorite or most used web pages in a "Favorites" list. Links can also be imported into a browser's "Favorites" list from a different computer or browser.

In an organization, "Favorites" lists may be very useful for personalizing user computers. The individual users may select those links they use most often in their work, which may improve work efficiency. However, since the user must add or import the links at the client computer, the "Favorites" list feature in many browsers may not be an efficient way to make links available across the organization.

SUMMARY

An enterprise system may include a server including an integration module that enables applications at the server to integrate web services, e.g., by providing links to the external web service. Each application is associated with one or more business types in a table at the server. The integration module, which may be an API, sends a list of external web services of a type (or types) associated with an application when a user at a client computer in the enterprise system opens that application, e.g., through an enterprise portal. The integration module may also generate a URL call and redirect the user's browser to an external web service when the user selects that external web service.

The URL call may be in an OCI/OPI-compliant format. The integration module may also receive a response from the selected external web service in an OCI/OPI-compliant format.

BRIEF DESCRIPTION OF THE DRAWINGS

FIG. 5A shows an exemplary Open Catalog Interface (OCI) inbound interface

FIG. 5B shows an exemplary OCI outbound interface.

DETAILED DESCRIPTION

Figure 1:
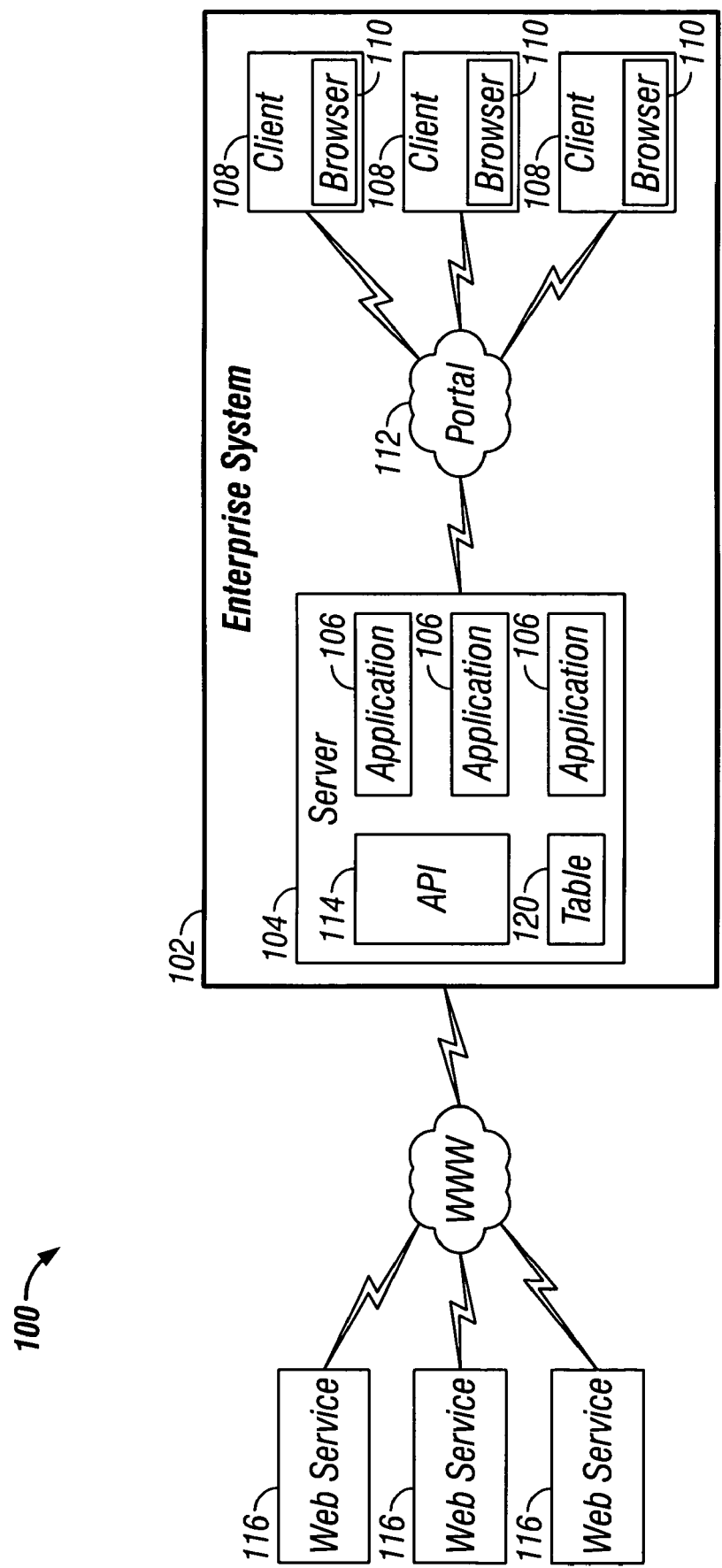
FIG. 1 is a block diagram of a system including integrated external web services.

FIG. 1 shows a computer-based system 100 including an enterprise system 102. The enterprise system 102 includes a server 104 that hosts applications 106 that may be utilized by users (e.g., employees of a company) at client computers 108.

The client computers may include browsers 110 that enable the clients to communicate with the server via, e.g., a web portal 112.

The server 104 may include an API (Application Programming Interface) 114 that enables the applications 106 at the server to integrate web services 116, e.g., by providing links to the external web service. This web service integration feature may provide a functionality similar to a personal "favorites" list of links. However, rather than individual users having to select individual links or import links into their browsers, the links are provided automatically through the application. This may provide a convenient way to make certain "favorite" links available across the organization.

Information about a number of external web services may be stored in a table 120 at the server 104. Every field in the table 120 may contain a name-value pair and have a type. The information stored in the table for each external web service may include the following information: the external web service URL (Uniform Resource Locator), which should refer to the location of the external web service; fields specific to the external web service, such as username and password; and a business type.

The business type indicates a classification for the web service based on the type of information the web service provides. The following are exemplary classifications that may be used for external web services: catalogs; business directories; search engines; chat rooms; newsgroups; marketplaces; portals; companies; associations; financial services; e-forms; etc. These classifications may be selected and assigned to selected external web services during a customization process for the web service integration feature.

Figure 2:
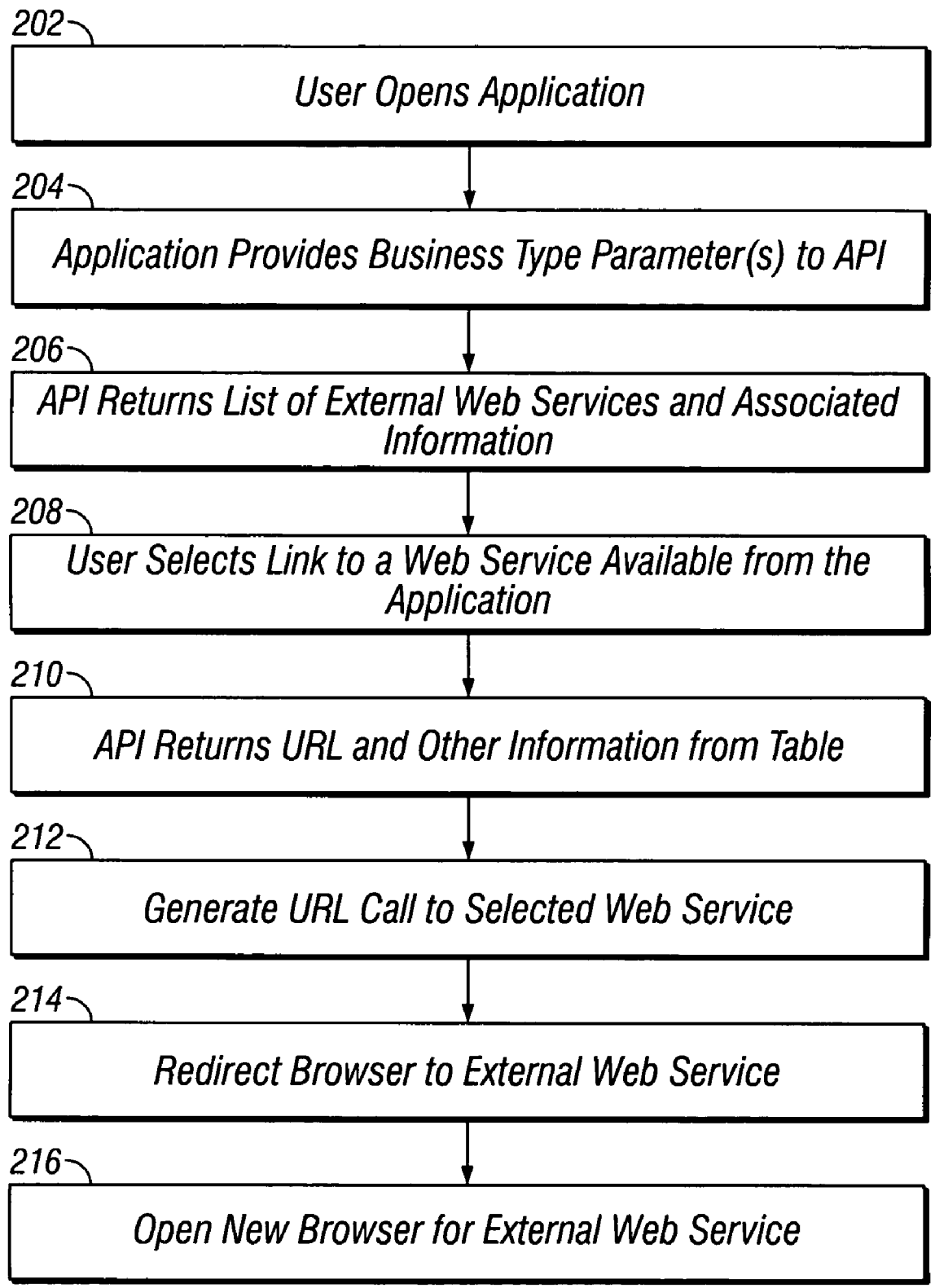
FIG. 2 is a flowchart describing a technique for providing access to integrated external web services.

FIG. 2 is a flowchart describing a technique for providing access to integrated web services according to an embodiment. When a user opens an application (block 202), the application may provide business type(s) as a parameter to the API (block 204). The API may then return a list of external web services assigned the business type(s) and information associated with those web services (block 206). This information may be displayed for the user in the form of hyperlinks and/or descriptions of the web services.

The user may trigger a call to an external web service by selecting a link to the web service (block 208). The API may return the URL of the external web service and all parameters from the table 120 that will be transferred to the web service (block 210). The server 104 may then construct a URL call to the external web service from the URL and parameters (block 212) and redirect the client browser to the external web service (block 214). The application may open a new browser at the client for the external web service (block 216).

Figure 3:
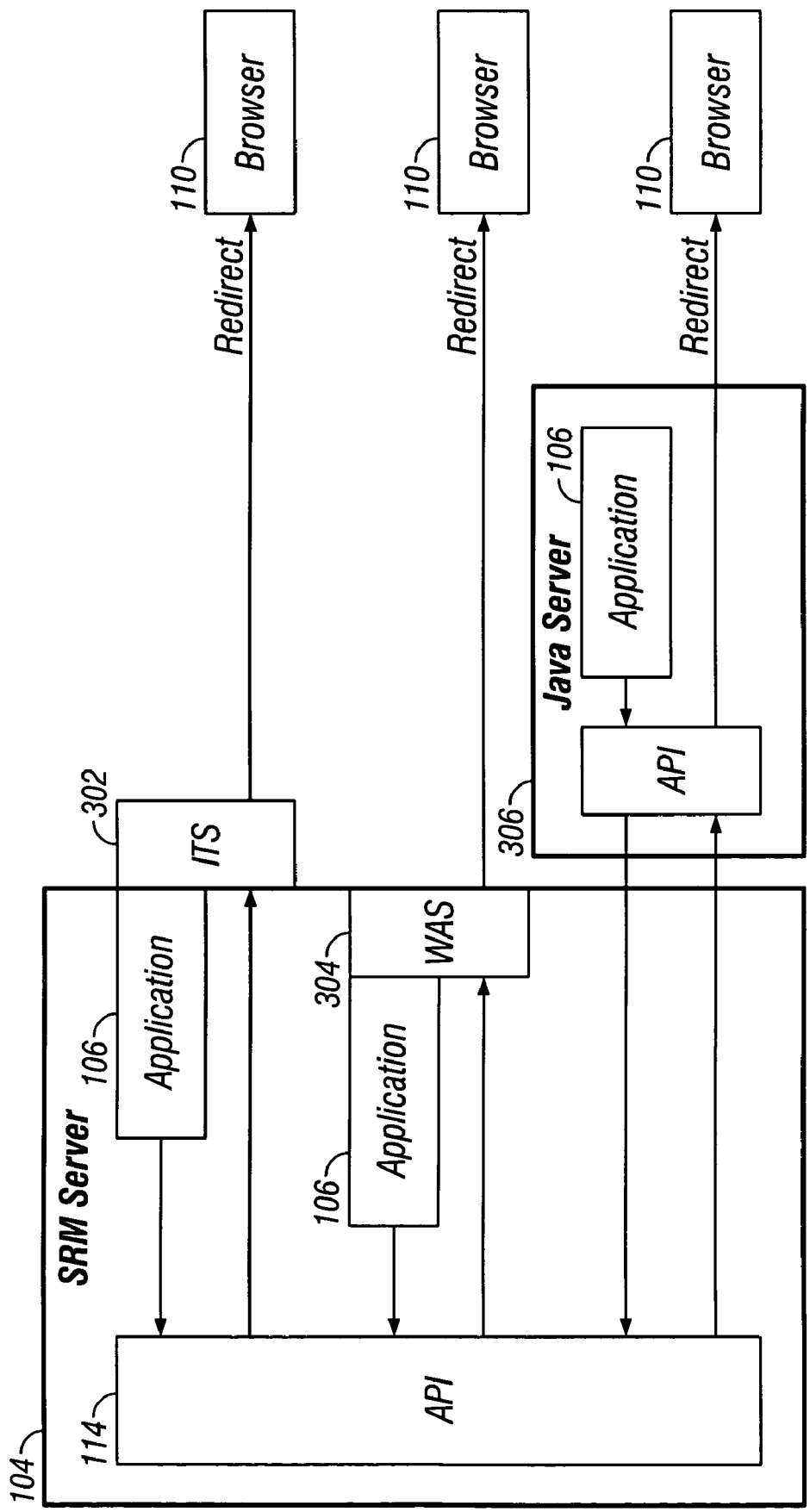
FIG. 3 is a block diagram illustrating an operation for redirecting a browser to an integrated external web service in different web platforms.

In an embodiment, the server may include SRM (Supplier Relationship Management) software developed by SAP AG of Waldorf, Germany. The enterprise system 102 may utilize an interface between the SRM server and the client computers, as shown in FIG. 3. The interface may be an SAP web platform, e.g., an ITS (Internet Transaction Server) 302, a WAS (Web Application Server) 304, or a Java-based platform, such as Webdynpro. For the Webdynpro platform, the functionality of the API may be provided as a java package at the Java server 306.

Figure 4:
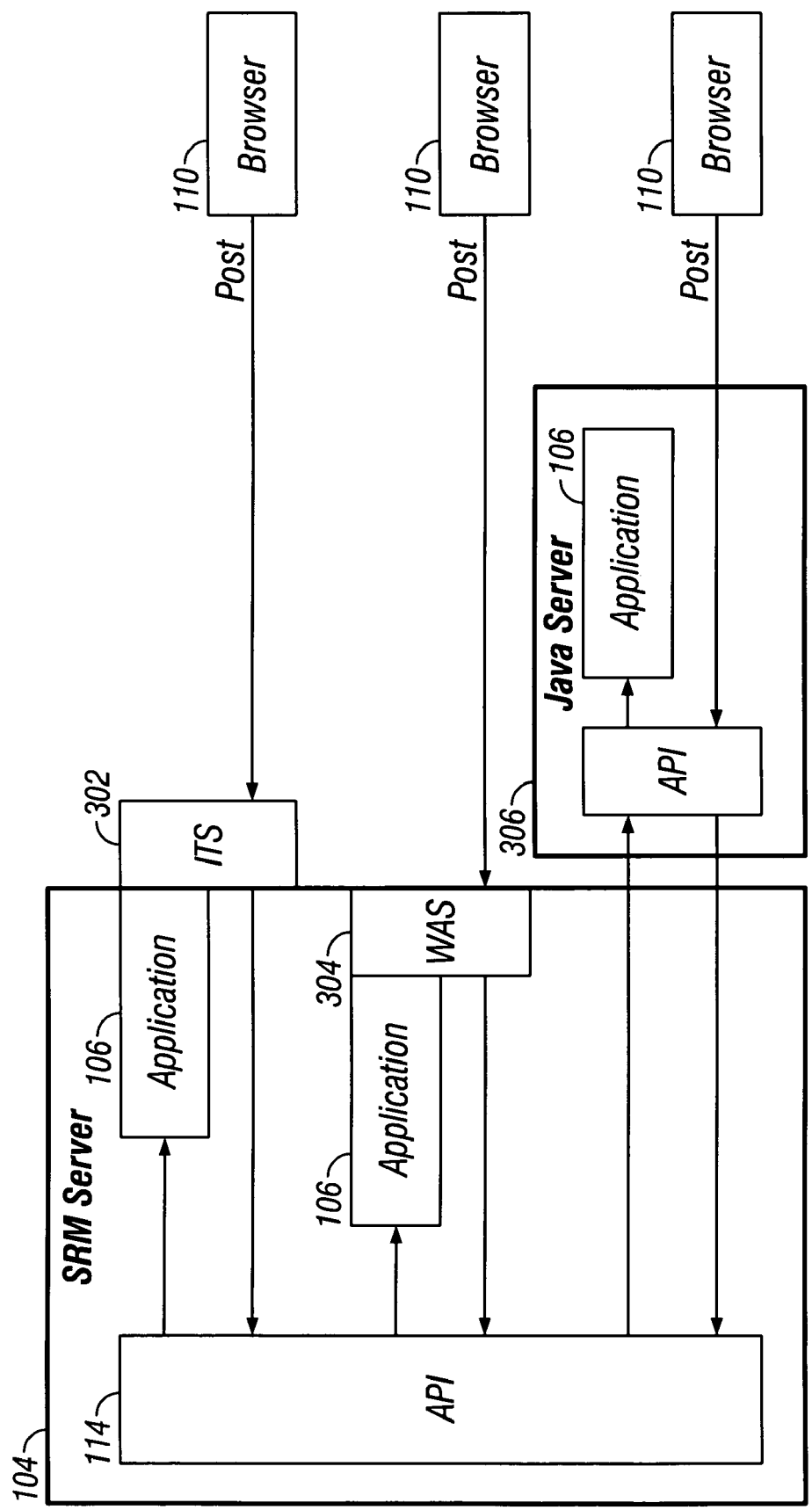
FIG. 4 is a block diagram for importing data from an integrated web service in different web platforms.

The enterprise system 102 and the external web services 116 may communicate using an interface protocol, such as the Open Catalog Interface (OCI)/Open Partner Interface (OPI) developed by SAP AG of Walldorf, Germany. In an embodiment, the API 114 will also allow the import of data from external web services that are OCI/OPI compliant, as shown in FIG. 4.

OCI/OPI uses standard Internet protocols, e.g., HTTP (Hypertext Transfer Protocol), to exchange information between the server and the external web services (e.g., catalog servers and external partner directories). Using the OCI/OPI, the enterprise system may send a request in an OCI/OPI-compliant format to an external web service, and the external web service may return a response page, including results compiled in response to the request, in an OCI/OPI-compliant format.

The OCI/OPI includes an outbound section and an inbound section. The outbound section consists of the information in the table 120 at the server 104 (FIG. 1). As described above, the enterprise system uses this information to construct a URL call to the external web service and then redirect the client browser to this URL. In an embodiment, the external web service may be accessed using the HTTP methods GET or POST, which includes the outbound interface field data. The OCI/OPI-compliant external web service then parses and decodes this data and may compile information to return to the enterprise system.

The inbound section consists of information that is sent to the enterprise system by the external web service. The inbound section may be sent back to the electronic procurement system in an OCI/OPI-compliant, e.g., an HTML page or an XML file. For example, the external web service may be a supplier that provides an electronic catalog. For each item selected in the catalog by the user and sent to the enterprise system, all required fields must be sent, along with the optional fields. The fields may include the following information: a description of the item; a quantity to add; a unit of measure of the item; a price; a currency; a product master number in the electronic procurement system; and a number of days until the item will be available. FIG. 5A shows exemplary fields for an OCI inbound interface, and FIG. 5B shows an exemplary OCI outbound interface, in this case an HTML response page.

As described above, the external web service integration feature may provide a convenient way to make certain "favorite" links available across the organization. Furthermore, the business type parameter provides a way to tailor the links made available to the particular application being used. The business type parameter also provides a way to update the links provided by a particular application. For example, for an application that provides links with the "search engine" business type, the links provided may be updated by adding and/or removing links with the "search engine" business type to or from the table.

The computer programs (also known as programs, software, software applications or code) described above may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although only a few embodiments have been described in detail above, other modifications are possible. The logic flow depicted in FIG. 2 does not require the particular order shown, or sequential order, to achieve desirable results. In certain implementations, multitasking and parallel processing may be preferable.

Other embodiments may be within the scope of the following claims.

What is claimed is:

1. A method comprising:

storing, at a server, an address for each of a plurality of web services and at least one of a plurality of parameters specific to each of the plurality of web services;

assigning each web service with one or more of a plurality of business types, the address including a uniform resource locator URL for each of the plurality of web services and the at least one parameter, the assignment stored at a table at the server;

associating one or more of said plurality of business types to an application;

in response to a client running the application, sending a list identifying one or more web services assigned with the one or more business types associated with the application;

and in response to the user selecting one of the one or more web services in the list, redirecting the client to the selected web service, by constructing, by the server, the URL for the selected web service from the address and the at least one parameter stored at the table at the server, wherein redirecting the client comprises generating a URL call with a format compliant with an Open Catalog Interface and an Open Partner Interface.

2. A method comprising:

storing, at a server, an address for each of a plurality of web services and at least one of a plurality of parameters specific to each of the plurality of web services, the address including a URL (Uniform Resource Locator);

assigning, at the server, each of the web services with one of a plurality of business types, the address including the URL and the at least one parameter, the business types representing the type of information each web service provides, the assignment stored at a table at the server;

associating, at the table at the server, one or more of said plurality of business types to an application;

sending, by the server in response to a client running the application, a list identifying one or more web services assigned with the one or more business types associated with the application; and redirecting, in response to the user selecting one of the one or more web services in the list, the client to the selected web service by constructing, by the server, the URL for the selected web service from the address and the at least one parameter stored at the table at the server, wherein redirecting the client comprises generating a URL call with a format compliant with an Open Catalog Interface and an Open Partner Interface.

3. The method of claim 1, wherein each address is stored in an entry in a table.

4. The method of claim 3, wherein additional information relating to the service is stored in the service entry in the table.

5. The method of claim 1, wherein the URL call is in an Open Catalog Interface and Open Partner Interface compliant format comprising an outbound section including information from the table.

6. The method of claim 1, further comprising: opening a new browser at the client for the selected service.

7. The method of claim 1, further comprising: receiving an Open Catalog Interface and Open Partner Interface compliant response from the service.

8. The method of claim 1, further comprising: in response to receiving the list at the client, displaying at the client an identifier for each of the one or more services in the list, the one or more services are assigned to enable customization.

9. A system comprising:
 a server including
  a plurality of applications, each application associated with one or more service types, and
  a table including a number of entries, each entry including an address for an external web service and a service type assigned to the external web service;
 a plurality of clients, each client including a browser;
 a first networked communication system operative to enable communication between the server and the plurality of clients;
 a second networked communication system operative to enable communication between the plurality of clients and external web services; and
 an integration module operative to:
  in response to a client opening one of the applications, sending a list identifying one or more external web services assigned with the one or more service types associated with the application; and
  in response to the user selecting one of said external web services in the list, redirecting the client browser to the selected external web service by constructing, by the integration module, the address including a uniform resource locator (URL) for the selected external web service, wherein redirecting the client comprises generating a URL call with a format compliant with an Open Catalog Interface and an Open Partner Interface.

10. The system of claim 9, wherein the address is a URL (Uniform Resource Locator).

11. The system of claim 9, wherein the integration module is an API (Application Programming Interface).

12. The system of claim 9, wherein the first networked communication system is an enterprise portal.

13. The system of claim 9, wherein the second networked communication system is the World Wide Web.

14. The system 9, wherein the each entry in the table includes additional information about the corresponding external web service.

15. The system of claim 9, wherein the integration module is operative to generate a URL call to the selected external web service from the entry in the table corresponding to the selected external web service.

16. The system of claim 9, wherein the integration module is operative to receive a response from the selected external web service in an Open Catalog Interface and Open Partner Interface compliant format comprising an outbound section including information from the table.

* * * * *